United States Patent [19]

Takken

[11] 4,327,377
[45] Apr. 27, 1982

[54] PHASE-SLIPPED TIME DELAY AND INTEGRATION SCANNING SYSTEM

[75] Inventor: Edward H. Takken, Alexandria, Va.

[73] Assignee: The United States of America as represented by the Secretary of the Navy, Washington, D.C.

[21] Appl. No.: 157,126

[22] Filed: Jun. 6, 1980

[51] Int. Cl.³ .............................................. H04N 5/33
[52] U.S. Cl. .................................. 358/199; 358/113; 358/206; 250/578; 250/334
[58] Field of Search .............. 358/212, 213, 113, 199, 358/206, 293; 250/211 J, 578, 330, 334

[56] References Cited

U.S. PATENT DOCUMENTS

| | | | |
|---|---|---|---|
| 3,723,642 | 3/1973 | Laakmann | 358/113 |
| 4,013,832 | 3/1977 | Douglass | 358/212 |
| 4,222,065 | 4/1980 | Pusch | 358/113 |

Primary Examiner—John C. Martin
Assistant Examiner—Edward L. Coles
Attorney, Agent, or Firm—Robert F. Beers; William T. Ellis; Alan P. Klein

[57] ABSTRACT

A scanning system wherein a linear array of N detector elements having a uniform spacing of X cm between their centers is oriented parallel to the line scan dimension of a raster so that each element of the array optically scans the entire field of view at a rate of V cm. per second. The detector elements are sampled every $t_s$ seconds where $$t_s = \frac{1}{\left(k \pm \frac{1}{N}\right)} \left(\frac{X}{V}\right),$$

k being an integer, and each produces, when sampled, an output signal proportional to the integrated energy exposure thereof between samplings. The output signals of the various detector elements are delayed as a function of each element's position within the array and the line scan rate. The delayed imaging signals add to provide an improved signal to noise ratio. The variability of the waveform of the composite output signal for small-sized distant targets is minimized by introducing a progressively increasing phase shift in the relative timing of the sampling signals and initial contact of the image at successive detector elements. The composite output signal of the array then corresponds to an average over all possible relative timings of sampling signals and initial contact of the image at a detector element.

10 Claims, 9 Drawing Figures

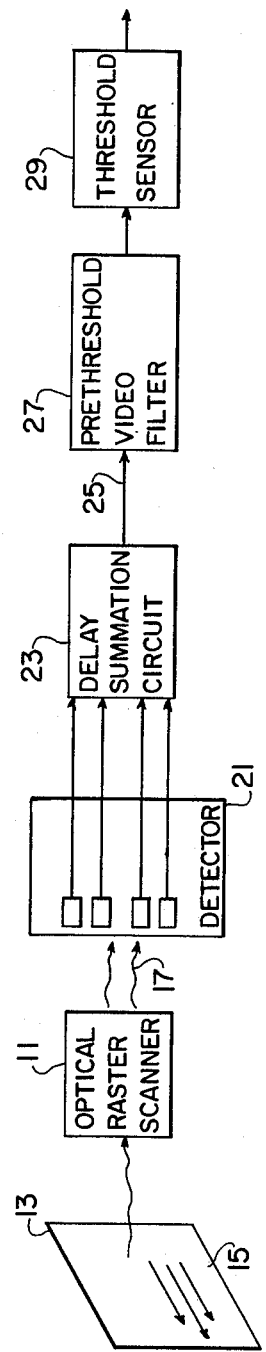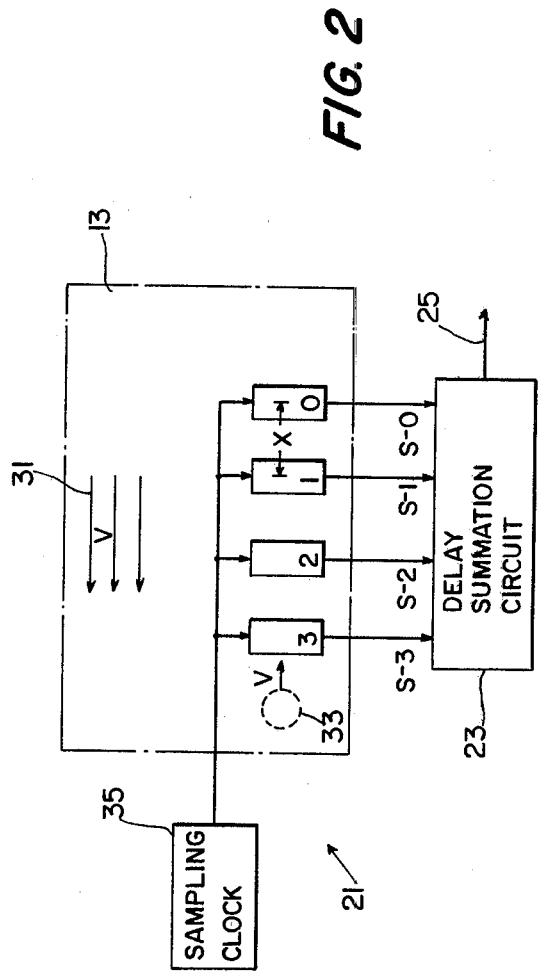

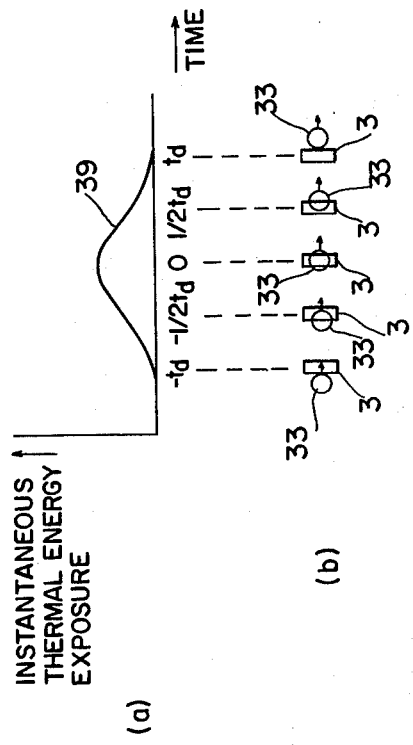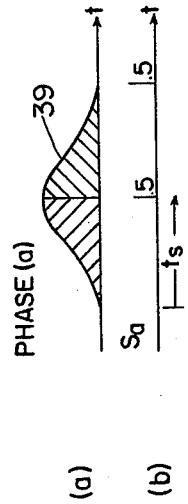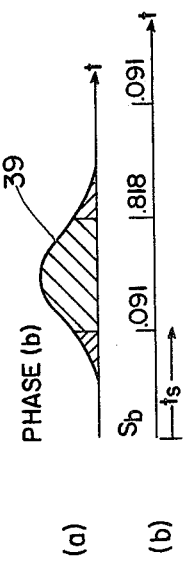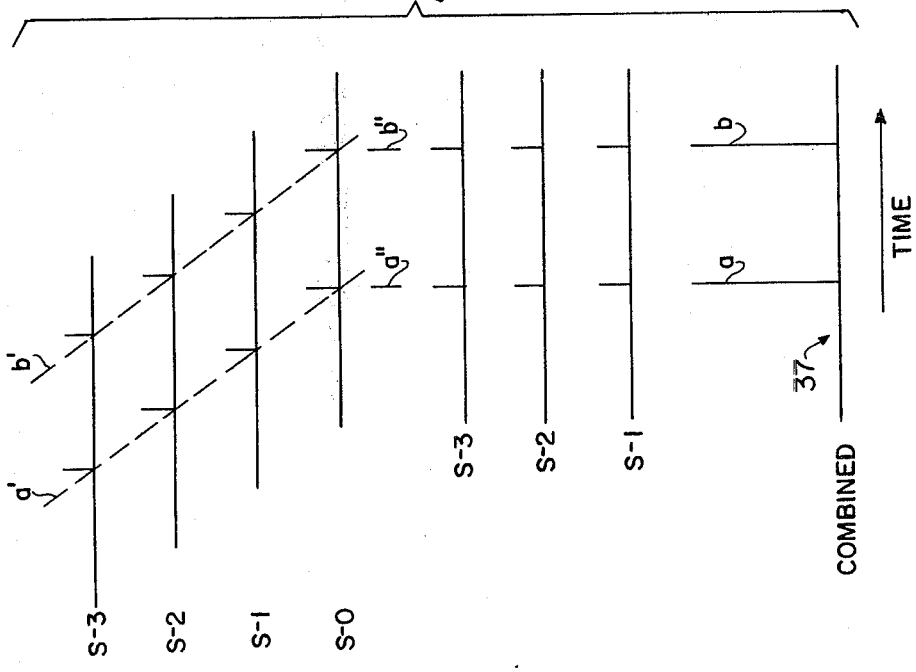

PHASE-SLIPPED TIME DELAY AND INTEGRATION SCANNING SYSTEM

BACKGROUND OF THE INVENTION

This invention relates generally to scanning systems, and more particularly to such systems wherein a linear detector array is optically scanned in a two-dimensional raster pattern.

Prior art thermal scanning systems such as described in U.S. Pat. No. 3,723,642, issued to Peter Laakman on Mar. 27, 1973, use a short linear array of detector elements oriented parallel to the "line scan" dimension of the raster so that each element optically scans the entire field of view. The detector elements are continuously sampled and their output signals are proportional to their instantaneous thermal energy exposure. The output signals of the various detector element are identical except for noise and a small time delay from each succeeding detector element to the next. By exactly compensating for the time delays and adding the individual output signals a single composite output signal is obtained which has improved sensitivity.

In a known modification of the above system, the detector elements are sampled at discrete intervals and their output signals are proportional to the integral of their instantaneous thermal energy exposure over the interval.

An important aspect of this modification is that the length of the intervals during which the integration occurs is an integral submultiple of the scanning time delay between detector elements so that the corresponding output signals of the various detector elements are identical except for noise and a small time delay from each succeeding detector element to the next. Such thermal scanning equipment has utility in automatic search and acquisition systems where the composite output signal from the array of detectors is electronically processed to detect the presence of a target. In operation, the composite output signal from the array of detectors is passed through a filter which is optimized to match an anticipated target power spectral density. When the output of the filter exceeds a fixed threshold, a threshold crossing sensor indicates the presence of the target. Typical matched filters and threshold crossing sensors are described in chapter 10 and chapter 2, respectively, of Skolnick, Introduction to Radar Systems (1980).

When small-size, distant targets enter the field of view, a problem arises in the use of discrete time sampling sensors, and in particular the modification described above. Since the image of the target may fall on or between the detector elements at the start of a given integration interval, the waveform of the composite output signal produced by the target can vary. This variation means that the automatic processor with its filter and threshold sensor cannot be truly optimized.

SUMMARY OF THE INVENTION

Accordingly, it is an object of the present invention to improve a scanning system.

Another object is to reduce the variability in the waveform of the composite output signal of a scanning system when small-sized distant targets enter the field of view.

Yet another object is to enable an automatic processor of the composite output signal of a scanning system to be optimized for small target detection.

The objects of the present invention are achieved by a scanning system wherein a linear array of N detector elements, having a uniform spacing of X cm. between their centers, is oriented parallel to the line scan dimension of a raster so that each element of the array optically scans the entire field of view at a rate of V cm. per second. The detector elements are sampled every $t_s$ seconds where $$t_s = \frac{1}{\left(k \pm \frac{1}{N}\right)} \left(\frac{X}{V}\right),$$

k being an integer, and each produces, when sampled, an output signal proportional to the integrated energy exposure thereof between samplings. The output signals of the various detector elements are delayed as a function of each element's position within the array and the line scan rate. The delayed imaging signals add to provide an improved signal-to-noise ratio. The variability of the waveform of the composite output signal for small-sized distant targets is minimized by introducing a progressively increasing phase shift in the relative timing of the sampling signals and initial contact of the image at successive detector elements. The composite output signal of the array then corresponds to an average over all possible relative timings of sampling signals and initial contact of the image at a detector element.

Additional advantages and features will become apparent as the subject invention becomes better understood by reference to the following detailed description when considered in conjunction with the accompanying drawings wherein:

BRIEF DESCRIPTION OF THE DRAWINGS

FIG. 1 is a block diagram of a scanning system in accordance with the subject invention.

FIG. 2 is a block diagram of the detector and delay summation circuits of the system of FIG. 1.

FIG. 3 is a timing diagram of the response of the system of FIG. 1 to a source of thermal energy, for explaining its operation.

FIG. 4(a) depicts the instantaneous signal output from a detector element as a circular image is scanned across it; and FIG. 4(b) depicts the corresponding relative positions of the detector element and the circular image.

FIG. 5(a) shows the successive parts of the continuous signal of FIG. 4(a) that are integrated in the detector element for phase (a); and FIG. 5(b) shows the corresponding numerical charge packet sizes.

FIG. 6(a) shows the successive parts of the continuous signal of FIG. 4(a) that are integrated in the detector element for phase (b); and FIG. 6(b) shows the corresponding numerical charge packet sizes.

DESCRIPTION OF THE PREFERRED EMBODIMENT

Referring now to the drawings, wherein like reference numerals designate identical or corresponding parts, and more particularly to FIG. 1 thereof, there is shown a scanning system according to the present invention. Optical raster scanner 11 scans a field of view 13 in a two-dimensional pattern 15 and positions a stationary optical beam 17 in a focal plane of a detector 21. An optical scanner suitable for unit 11 is disclosed in U.S. Pat. No. 3,723,642 issued to Peter Laakman on Mar. 27, 1973, and herewith incorporated by reference. Detector 21 comprises a linear array of elements responsive to the intensity of beam 17 for providing output imaging signals as a function thereof. To maintain the clarity of the drawings, only four detector elements of the array are illustrated, but it will be understood that as many elements as required for a desired degree of resolution may be employed-sixteen elements being a more typical number.

The output signal from each of the detector elements is applied to a delay summation circuit 23. Circuit 23 delays the imaging signals from the individual detector elements to compensate for the scanning time lag between detector elements and combines the delayed signals. The combined, delayed video signals are applied in lead 25 to an optimized filter 27 for filtering prior to being applied to a threshold crossing sensor 29. Sensor 29 detects the presence of a point source of thermal energy, for example, a distant target when the output of filter 27 exceeds a fixed threshold. To be truly optimum, filter 27 must be specified using the waveform of the anticipated target signal.

FIG. 2 is a detailed block diagram of the detector 21 and the delay summation circuit 23 of the thermal imaging system of FIG. 1. The detector 21 comprises a linear array of N detector elements (N=4) in the illustrated embodiment) having a uniform spacing of X cm. between their centers. The detector elements (labeled 0 through 3) are oriented parallel to the horizontal scan direction 31. For clarity of drawing, the size and spacing between elements has been greatly exaggerated in FIG. 2; it being understood that in practice the elements may be small adjacent sections of a single strip of solid state material.

The image 33 of any given point source of thermal energy in the field is broadened into a circle by diffraction effects within the optical raster scanner 11. As the circular image 33 is scanned across the array at a horizontal scan rate of V cm. per second, it will activate detector element 3, then 2, 1, and 0 in that order, every X/V seconds. Each of the detector elements, which may be, for example, a charge-coupled photodiode, when activated, will generate an electric charge which is accumulated in the semiconductive material beneath it. The accumulated charge is proportional to the integrated thermal energy exposure of the respective detector element. The charge packets accumulated in each element are transferred, in parallel, to the delay summation circuit 23, in response to sampling signals generated by clock 35. That is, each detector element is adapted to produce, when sampled, an output signal proportional to its integrated thermal energy exposure between samplings. The sampling signals are generated by clock 35 every $t_s$ seconds, and in the preferred embodiment $t_s$ is a non-integral sub-multiple of the scanning time delay between detector elements (X/V). Specifically, $t_s = [X/V/(k+\delta)]$ where k is any integer, and $\delta$, defined as the phase-slip parameter, equals $\pm 1/N$. The delay summation circuit 23 which may be for example, a shift register, delays the output signals from each of the detector elements as a function of the horizontal scan rate and its position in the array such that signals from almost matching segments of the circular image 33 and different detector elements are in time coincidence.

Specifically, the output signals S-0 from detector element 0 have no time delay applied thereto; signals S-1 from detector element 1 are delayed for a period of 1·X/V seconds; signals S-2 from detector element 2 are delayed by 2·X/V seconds; signals S-3 from detector element 3 by 3·X/V seconds; and so forth. Simultaneously, the delay summation circuit 23 sums the delayed output signals from each of the detection elements so as to provide a resultant output signal on line 25 indicative of the presence of a point source of thermal energy within the field of view. The delay-summation operation provides improved resolution (signal-to-noise ratio).

FIG. 3 illustrates the operation of the scanning system of FIG. 1 when the phase-slip parameter $\delta$ is set equal to zero as in the prior art. Referring again to FIG. 2, let it be assumed that k=2 so that sampling signals are generated every $t_s = \frac{1}{2}$ (X/V) seconds, i.e., at intervals equal to $\frac{1}{2}$ the scanning time delay between detector elements, and that at the time a particular sampling signal is generated by clock 35, the circular image 33 initially contacts detector element 3. The charge packets from each of the detector elements are shown in the first four rows of FIG. 3. As indicated by diagonal lines a' and b' in FIG. 3, the corresponding charge packets transferred by each detector element as the circular image 33 is scanned across it are displaced in time from one another in a linear fashion. Rows 5 through 7 (counting down in sequence from the top row in FIG. 3) illustrate the delayed charge packets, with those corresponding to the same segment of the circular image being in time-coincidence. This condition is indicated by the vertical lines a'' and b''. The combined waveform 37 of FIG. 3 illustrates the approximate signal-to-noise enhancement resulting from the device of FIG. 1. (The solid horizontal line indicates the noise level).

Referring again to FIG. 2, waveform 37 was derived based on the assumption that at the time a particular sampling signal is generated by clock 35, the circular image 33 initially contacts the left edge of detector element 3. In fact, however, the relative timing of the sampling signals and initial contact of the image 33 with detector 3 is completely random since the target can enter the field of view at any time. If it is assumed, instead, that the circular image 33 overlaps detector element 3 at the time the particular sampling signal is generated (a situation which is equally probable), a completely different waveform results, depending on the details of the overlap. This variability in the appearance of waveform 37 means that for the case of $\delta = 0$, filter 27 cannot be truly optimized.

To illustrate, reference is made to FIG. 4(a) which depicts the instantaneous thermal energy exposure of detector element 3 as the circular image 33 is scanned across it. Curve 39 is assumed to be bell-shaped and of the form $$\frac{1}{2} + \frac{1}{2} \cos(\pi t/t_d) \text{ for } |t| \leq t_d \text{ and}$$
$$0 \text{ for } |t| > t_d,$$

where $t_d$ is defined as the dwell time. FIG. 4(b) depicts the corresponding relative positions of the detector element 3 and the circular image 33 at intervals of $t_d/2$. The circular image is indicated as reaching the detector element at $t = -t_d$, and finally leaving the detector element at $t = t_d$;

FIGS. 5 and 6 illustrate two instances of sampling when the scanning time delay between detector elements $(X/V) = 2\, t_d$, and the sampling signals are generated every $t_s = t_d$ seconds. It will be recalled that the accumulated charge is proportional to the integrated thermal energy exposure of the respective detector element. The cross-hatched areas in FIGS. 5(a) and 6(a) show the successive parts of the thermal energy exposure curve 39 that are integrated in the detector element 3. For what is designated as phase (a), the first integration interval happens to begin simultaneously with initial contact of the circular image 33 with the detector element 3. The initial charge packet results from an integration over the left half of the thermal energy exposure curve 39. For what is designed as phase (b), the first integration interval begins half an integration interval before phase (a). In this case, the initial charge packet results from an integration over only the first quarter of the thermal energy exposure curve 39. The numerical charge packet sizes are shown in FIGS. 5(b) and 6(b) for the case when the proportionality constant between the accumulated charge and the integrated thermal energy exposure is unity. The output for phase (a) is $S_a = (0, 0.5, 0.5)$; that for phase (b) is $S_b = (0.091, 0.818, 0.091)$. Of course, phase (a) and phase (b) are not the only phases that can occur, because in fact the timing relationship between the circular image 33 and the sampling signals is totally arbitrary. It is this multiplicity of possibilities that makes it impossible to define a matched or optimized filter for the case of $\delta = 0$.

In accordance with the invention, the filter 27 is optimized by perturbing the timing relationship of the sampling signals by setting $\delta = \pm 1/N$ so as to introduce a progressively increasing phase shift in the relative timing of the sampling signals and initial contact of the image at successive detector elements. The composite output signal on line 25 then corresponds to an average over all possible phases, such as phases (a) and (b). This final "phase-slipped" waveform 37 is much less variable than for the case of $\delta = 0$, and filter 27 can be matched to it, thus satisfying the need for reliable target detection.

The invention has been referred to herein as a thermal scanning system for lack of a more generic term. However, it is understood that the invention is not limited to any particular frequency range, such as the infrared spectrum, for example. Rather, the invention has wide applicability to systems in which detection elements are utilized in such a manner that electrical output signals are obtained from each of the elements.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A scanning system comprising:
   a linear array of N detector elements having a uniform spacing of X cm. between their centers;
   means for scanning a field of view in two dimensions at a rate of V cm. per second along one of the two dimensions and applying received energy to the array,
   the array being oriented parallel to the one of the scanning dimensions, each detector element adapted to produce, when sampled, an output signal proportional to integrated energy exposure thereof between samplings;
   means for sampling the N detector elements every $t_s$ seconds, where $$t_s = \frac{1}{\left(k + \frac{1}{N}\right)}\left(\frac{X}{V}\right)$$

and k is an integer; and
   delay summation means for delaying the output signals from each of the N detector elements as a function of the scan rate and relative position of each of the detector elements and summing the delayed output signals from each of the detector elements so as to provide a resultant output signal indicative of relative energy distribution within the field of view.

2. The scanning system recited in claim 1 wherein: the detector elements include charge-coupled photodiodes.

3. The scanning system recited in claim 1 wherein: the delay summation means includes a shift register.

4. The scanning system recited in claim 1 wherein: the sampling means includes a clock having a period of $t_s$ seconds.

5. A scanning system comprising:
   a linear array of N detector elements having a uniform spacing of X cm. between their centers;
   means for scanning a field of view in two dimensions at a rate of V cm. per second along one of the two dimensions and applying received energy to the array,
   the array being oriented parallel to the one of the scanning dimensions, each detector element adapted to produce, when sampled, an output signal proportional to integrated energy exposure thereof between samplings;
   means for sampling the N detector elements every $t_s$ seconds, where $$t_s = \frac{1}{\left(k - \frac{1}{N}\right)}\left(\frac{X}{V}\right)$$

and k is an integer; and
   delay summation means for delaying the output signals from each of the N detector elements as a function of the scan rate and relative position of each of the detector elements along the linear array and summing the delayed output signals from each of the detector elements so as to provide a resultant output signal indicative of relative energy distribution within the field of view.

6. The scanning system recited in claim 5 wherein: the detector elements include charge-coupled photodiodes.

7. The scanning system recited in claim 5 wherein: the delay summation means includes a shift register.

8. The scanning system recited in claim 5 wherein: the sampling means includes a clock having a period of $t_s$ seconds.

9. A method of scanning comprising the steps of: scanning a field of view in two dimensions at a rate of V cm. per second along one of the two dimensions;

applying received energy to a linear array of N detector elements oriented parallel to the one of the scanning dimensions, the detector elements having a uniform spacing of X cm. between their centers, each detector element adapted to produce, when sampled, an output signal proportional to integrated energy exposure thereof between samplings;

sampling the N detector elements every $t_s$ seconds, where $$t_s = \frac{1}{\left(k + \frac{1}{N}\right)}\left(\frac{X}{V}\right)$$

and k is an integer;

delaying the output signals from each of the N detector elements as a function of the scan rate and relative position of each of the detector elements along the linear array; and summing the delayed output signals from each of the detector elements so as to provide a resultant output signal indicative of relative energy distribution within the field of view.

10. A method of scanning comprising the steps of:

scanning a field of view in two dimensions at a rate of V cm. per second along one of the two dimensions;

applying received energy to a linear array of N detector elements oriented parallel to the one of the scanning dimensions, the detector elements having a uniform spacing of X cm. between their centers, each detector element adapted to produce, when sampled, an output signal proportional to integrated energy exposure thereof between samplings;

sampling the N detector elements every $t_s$ seconds, where $$t_s = \frac{1}{\left(k - \frac{1}{N}\right)}\left(\frac{X}{V}\right)$$

and k is an integer;

delaying the output signals from each of the N detector elements as a function of the scan rate and relative position of each of the detector elements along the linear array; and summing the delayed output signals from each of the detector elements so as to provide a resultant output signal indicative of relative energy distribution within the field of view.

* * * * *